US008274395B1

(12) United States Patent
Erickson et al.

(10) Patent No.: US 8,274,395 B1
(45) Date of Patent: Sep. 25, 2012

(54) BATTERY MONITORING SYSTEMS AND METHODS

(75) Inventors: Earl Erickson, Madison, AL (US); William Shindel, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 379 days.

(21) Appl. No.: 12/701,835

(22) Filed: Feb. 8, 2010

(51) Int. Cl.
*G08B 21/00* (2006.01)
*H04Q 5/22* (2006.01)
*H02J 7/00* (2006.01)
*G05F 3/00* (2006.01)
*A61N 1/00* (2006.01)
*G06F 11/00* (2006.01)

(52) U.S. Cl. .................. 340/636.13; 340/10.1; 320/119; 320/134; 320/125; 323/229; 607/61; 361/91.5; 361/125; 714/22

(58) Field of Classification Search .................. None
See application file for complete search history.

(56) References Cited

U.S. PATENT DOCUMENTS

| 5,663,711 A | 9/1997 | Sanders et al. |
| 5,745,670 A * | 4/1998 | Linde .............................. 714/22 |
| 5,764,032 A | 6/1998 | Moore |
| 5,867,007 A | 2/1999 | Kim |
| 6,124,797 A | 9/2000 | Mercado |
| 6,153,947 A | 11/2000 | Rockow et al. |
| 6,452,362 B1 | 9/2002 | Choo |
| 7,148,808 B1 | 12/2006 | Pfahlert et al. |
| 7,962,222 B2 * | 6/2011 | He et al. .......................... 607/61 |
| 2003/0102845 A1 * | 6/2003 | Aker et al. ..................... 320/139 |
| 2003/0189483 A1 * | 10/2003 | Saitoh et al. ................. 340/10.1 |
| 2004/0099738 A1 * | 5/2004 | Waters .......................... 235/451 |

* cited by examiner

*Primary Examiner* — Jennifer Mehmood
*Assistant Examiner* — Fekadeselassie Girma
(74) *Attorney, Agent, or Firm* — Maynard, Cooper & Gale, P.C.; Jon E. Holland (57) ABSTRACT

A system for monitoring batteries comprises a current control element coupled in parallel to a diode and across a battery. The current control element measures current on the cathode end of the diode. Once the voltage potential reaches a threshold, the current control element routes the current from the cathode end of the diode to the anode end of the diode thereby reducing the voltage potential across the battery terminal. Accordingly, a battery sensing element is prevented from falsely sensing a presence of an operable battery due to leakage current of the diode.

11 Claims, 11 Drawing Sheets

BATTERY MONITORING SYSTEMS AND METHODS

RELATED ART

In current telecommunication networks, data streams are often routed by network communication modules located at network facilities. Such a network communication module is typically located in a slot of a chassis, which allows multiple network communication modules to be powered by a pair of redundant batteries through a backplane. This arrangement allows one battery to power the network communication modules while the other battery functions as a backup power supply to prevent system failure in case the first battery fails or is removed from the system. Oftentimes, one network communication module in a chassis includes circuitry for sensing whether the batteries are present and sending an alarm signal when one of the batteries has been removed or fails.

Such circuit typically includes ORing diodes for isolating the power supplies and at least one battery sensing element for sending an alarm signal when the voltage across battery terminals falls below a threshold. The alarm signal may be used to provide a visual or audible alarm for notifying a user of the missing or failed battery.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure pertain to systems and methods for monitoring batteries in power supply systems. A system in accordance with an exemplary embodiment of the present disclosure comprises a current control element coupled in parallel to a diode and across a battery. The current control element measures current on the cathode end of the diode. Once the voltage potential reaches a threshold, the current control element routes the current from the cathode end of the diode to the anode end of the diode thereby reducing the voltage potential across the battery terminal. Accordingly, a battery sensing element is prevented from falsely sensing a presence of an operable battery due to leakage current of the diode.

Figure 1:
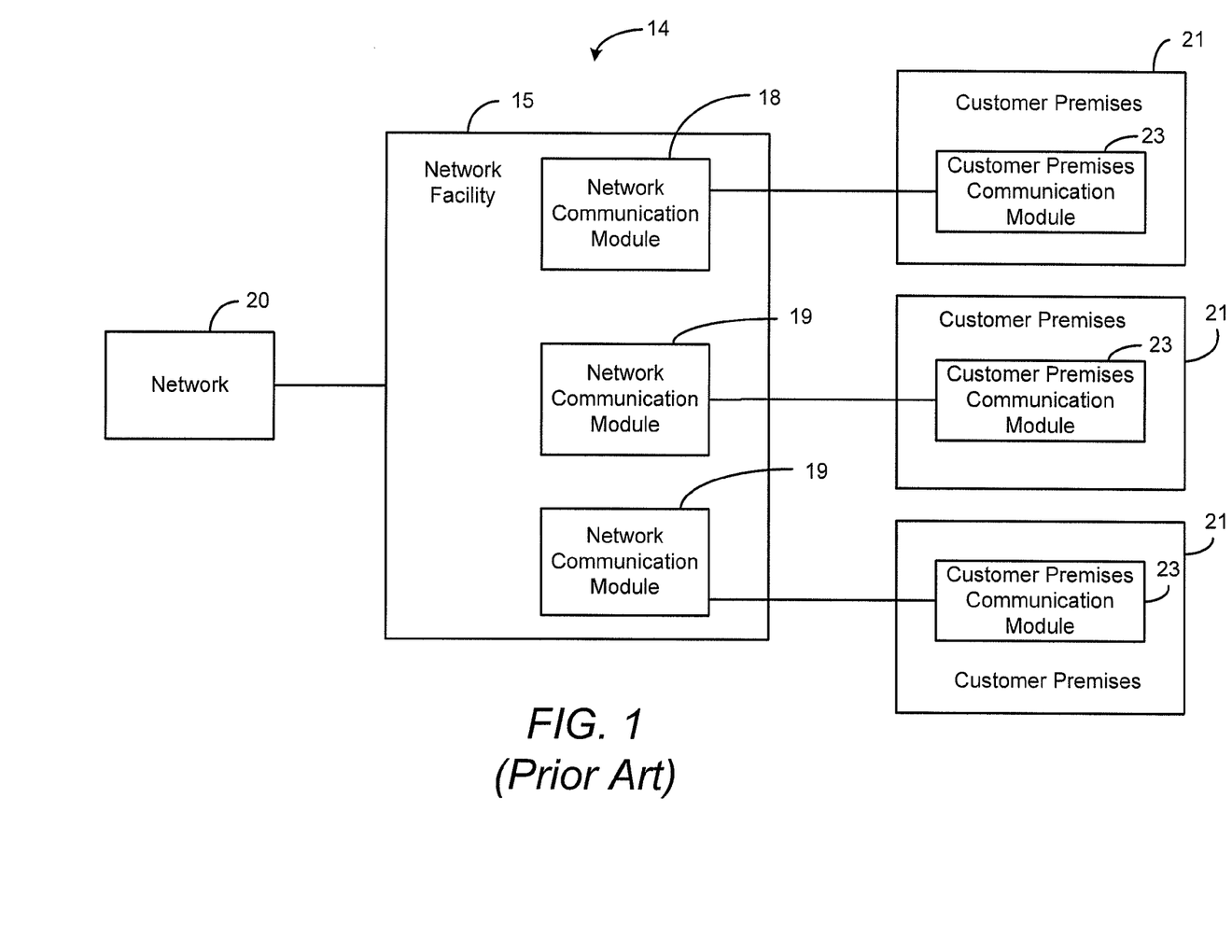
FIG. 1 is a block diagram illustrating a conventional communication system.

FIG. 1 depicts a conventional communication system 14. The communication system 14 comprises a network facility 15, such as a central office of a telecommunication network, having a plurality of network communication modules 18, 19. The network communication modules 18, 19 receive data from at least one high-speed data signal from a network 20. The network communication modules 18, 19 transmit the received data to a plurality of customer premises 21, whereupon customer premises communication modules 23 receive the data for use by customers. Additionally, data may be transmitted in the opposite direction from the customer premises 21 through the network communication modules 18 to the network 20.

Figure 2:
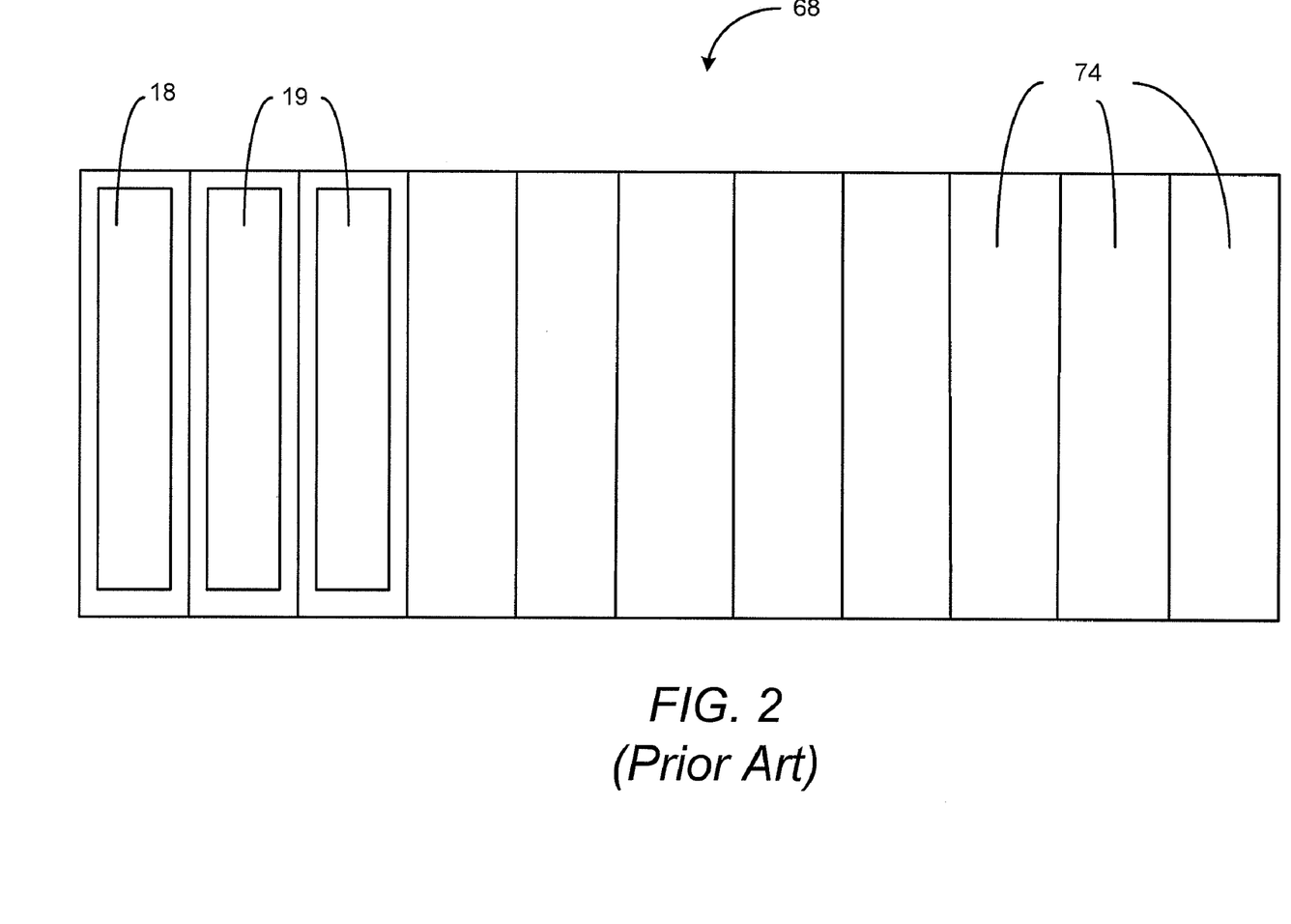
FIG. 2 depicts a conventional chassis utilized in the network facility of FIG. 1.
Figure 3:
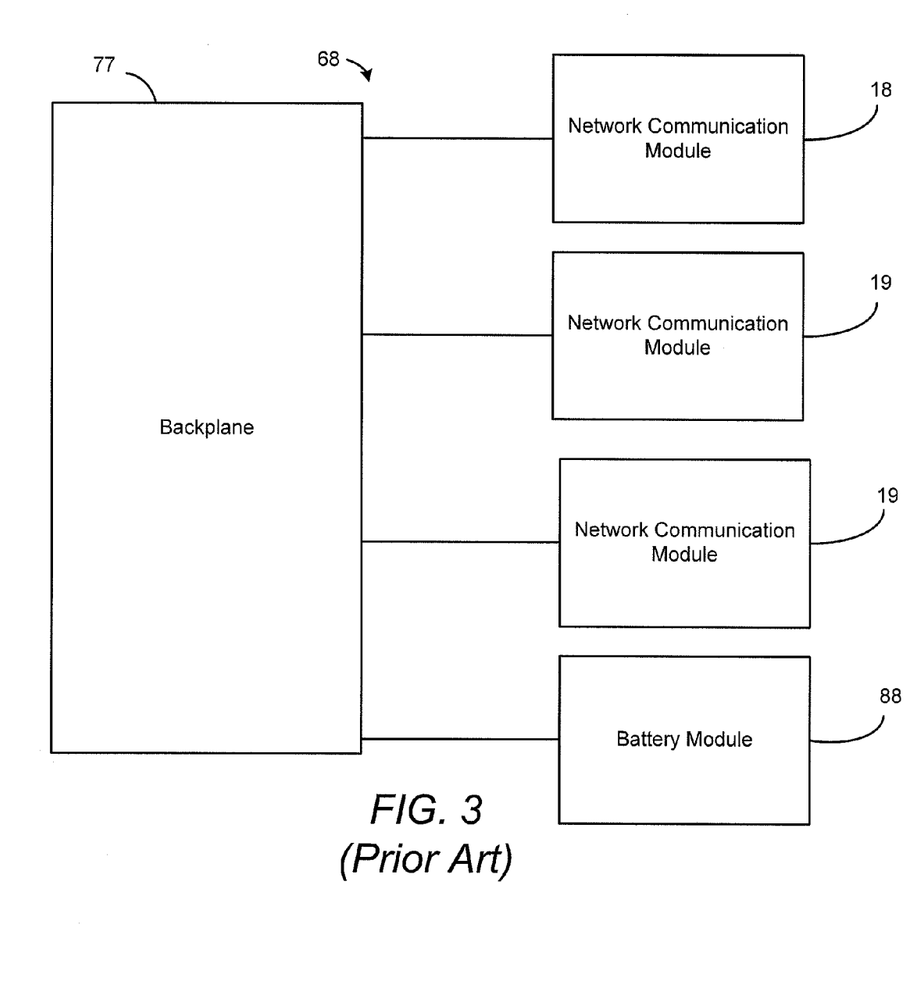
FIG. 3 is a block diagram illustrating network communication modules communicating with a battery module through a backplane of the chassis of FIG. 2.

FIG. 2 depicts a conventional chassis 68 utilized in the network facility 15 of FIG. 1. A typical chassis 68 has slots 74 for receiving a plurality of network communication modules 18, 19. As shown by FIG. 3, the chassis 68 also has a backplane 77 that conductively couples the modules 18, 19 to one another thereby enabling communication between the modules 18, 19. In addition, a battery module 88 is inserted into one of the chassis slots 74 and is conductively coupled to the backplane 77. As will be described in more detail hereafter, the battery module 88 provides electrical power to the other modules 18, 19 through the backplane 77.

Figure 4:
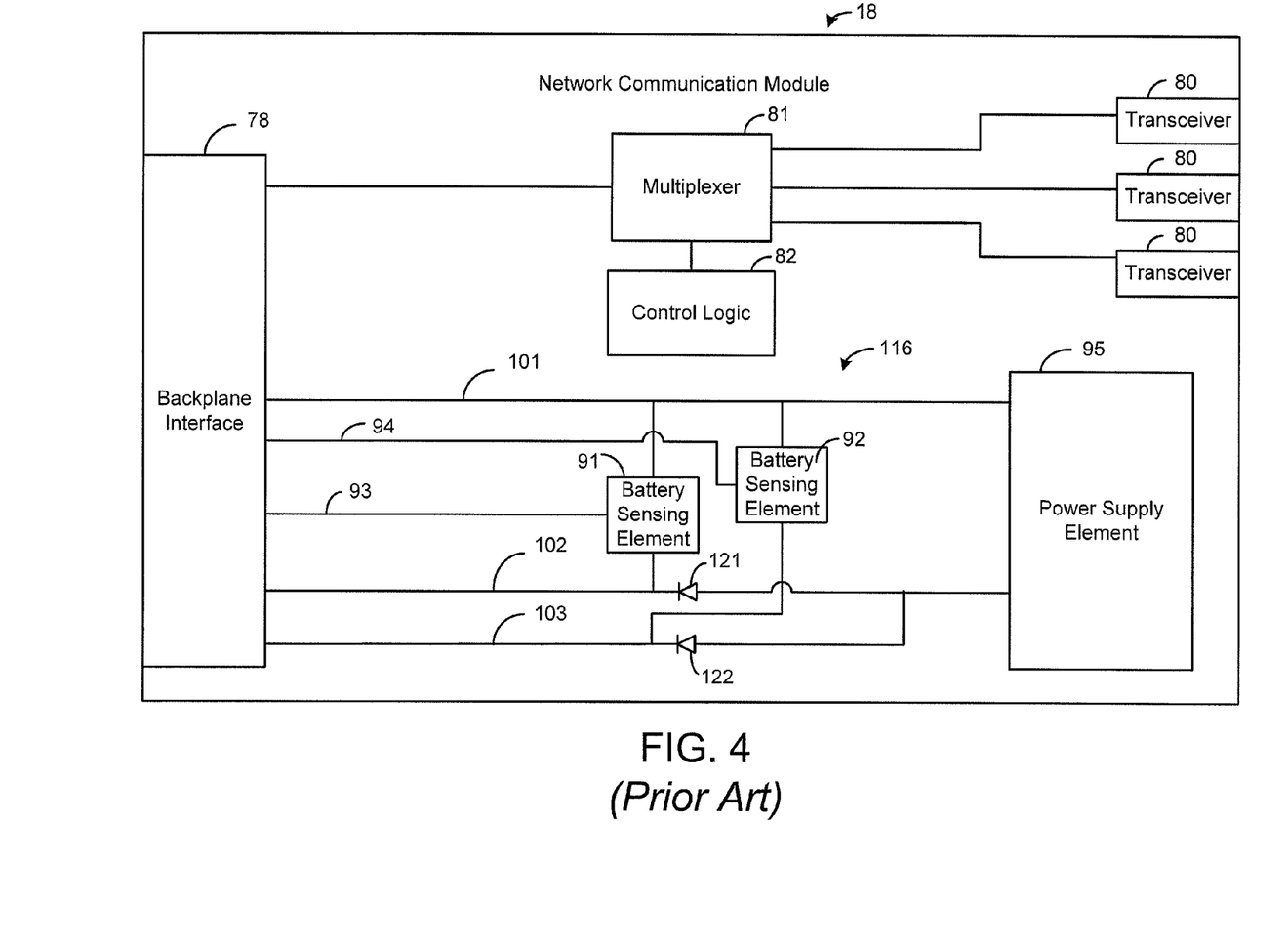
FIG. 4 is a block diagram illustrating a network communication module having conventional battery sensing circuitry.

FIG. 4 depicts a block diagram illustrating a network communication module 18 having conventional battery sensing circuitry 116. The network communication module 18 comprises a backplane interface 78 for interfacing the network communication module 18 to the backplane 77 (FIG. 3). Transceivers 80 connect to the backplane interface 78 through a multiplexer 81, which is controlled by control logic 82. Conventional battery sensing circuitry 116 is also located on the network communication module 18, and the battery sensing circuitry 116 is connected to the backplane interface 78.

Diodes 121, 122 are typically located on all of the network communication modules 18, 19, as shown in FIG. 4. However, in a typical network facility 15, the battery sensing elements 91, 92 are located only on the network communication module 18 and not on the network communication modules 19.

Figure 5:
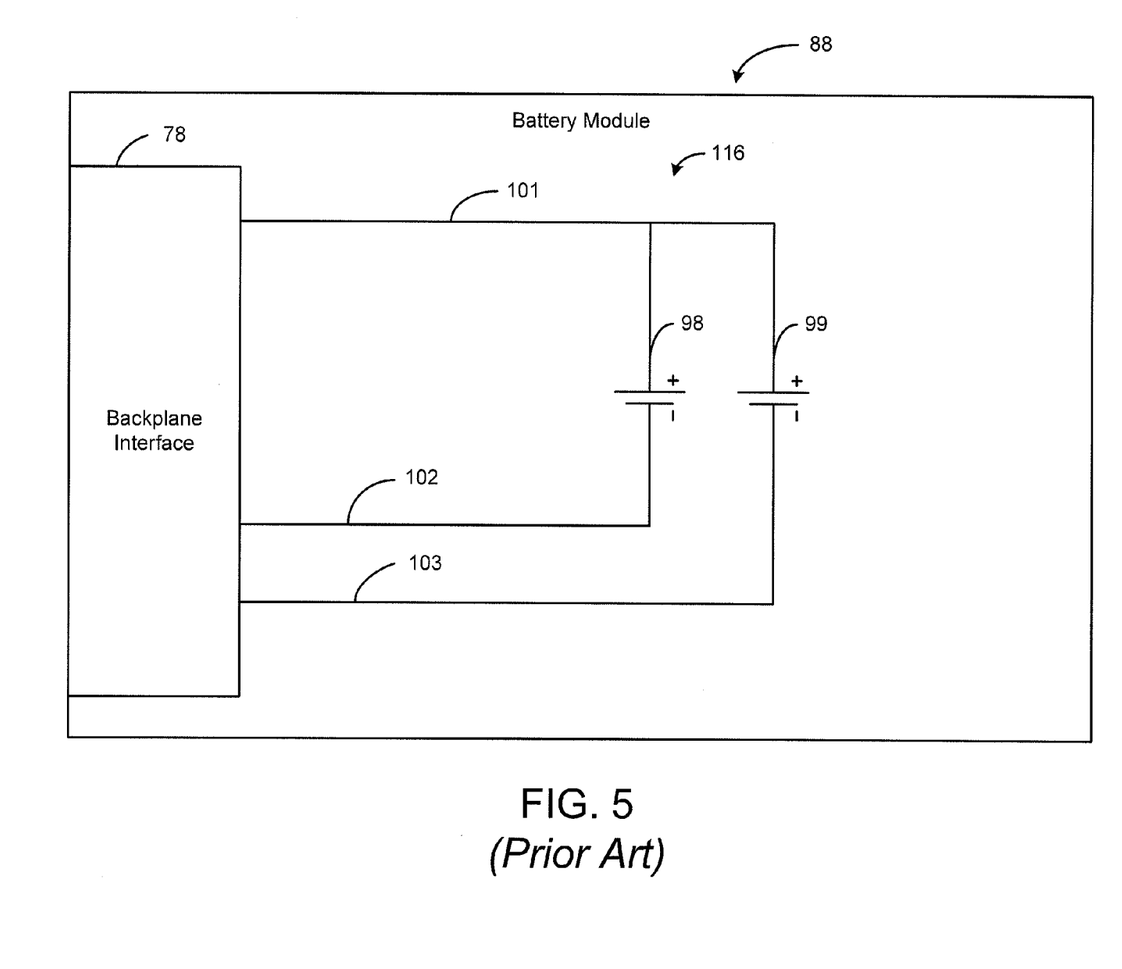
FIG. 5 is a block diagram illustrating a battery module depicted in FIG. 3.

The battery sensing circuitry 116 comprises a positive voltage connection 101 coupled through the backplane 77 to the positive terminals of a plurality of batteries (FIG. 5), and a plurality of negative voltage connections 102, 103 respectively coupled through the backplane 77 to the negative end of a battery (FIG. 5). The positive voltage connection 101 and negative voltage connections 102, 103 extend in parallel from the backplane interface 78 and provide electrical power to a power supply element 95. The power supply element 95 is configured to supply power to other components of the module 18, such as the control logic 82 and transceivers 80, for example. As an example, the power supply element 95 may comprise a power converter (not shown) for converting power to a desired voltage for use by the other components.

The conventional battery sensing circuitry 116 further comprises a plurality of diodes 121, 122 for controlling the directional flow of current in the battery sensing circuitry 116. The diode 121 is located along the negative voltage connection 102, with the cathode end of the diode 121 coupled to the backplane interface 78 and the anode end of the diode 121 coupled to the power supply element 95 as shown. The diode 122 is positioned along the negative voltage connection 103 in parallel with the diode 121, with the cathode end coupled to the backplane interface 78 and the anode end coupled to the power supply element 95.

The battery sensing circuitry 116 further comprises a plurality of battery sensing elements 91, 92 configured to detect a battery alarm condition, such as when a battery has been removed from the circuit or when the voltage across the battery terminals falls below a threshold. Upon detecting a battery alarm condition, a battery sensing element 91, 92 transmits an alarm signal via connections 93, 94, respectively. An alarm signal may be transmitted to an alarm device, such as a light source or a speaker, to provide a video or audible alarm, or an alarm signal may be transmitted through the backplane interface 78 to a signal processor located at another point in the network 20 to notify a technician. The alarm signal may be transmitted to components located within the chassis 68 or on the network communication module 118 itself. Various other uses of an alarm signal are possible.

The battery sensing element 91 is coupled to the positive voltage connection 101 and to the negative voltage connection 102 at the cathode end of the diode 121. The battery sensing element 92 is coupled to the positive voltage connection 101 and to the negative voltage connection 103 at the cathode end of the diode 122. The battery sensing elements 91, 92 are effectively connected in parallel to the batteries (FIG. 5), respectively, through the backplane 77. The battery sensing elements 91, 92 are typically implemented in hardware but may be implemented in any combination of hardware, software, or firmware.

FIG. 5 is a block diagram illustrating the battery module 88 depicted in FIG. 3. Like the network communication modules 18, 19, the battery module 88 comprises a backplane interface 78 for interfacing the module 88 with the chassis backplane 77 (FIG. 3). Furthermore, the battery module 88 comprises a plurality of batteries 98, 99 configured to provide power to the power supply elements 95 (FIG. 4) of the network communication modules 18, 19. The positive voltage connection 101 and negative voltage connections 102, 103 are connected to the backplane interface 78. The positive voltage connection 101 extends through the backplane 77 to the positive terminals of the batteries 98, 99. The negative voltage connection 102 extends through the backplane 77 to the negative terminal of the battery 98, and the negative voltage connection 103 extends through the backplane 77 to the negative terminal of the battery 99. Thus, the batteries 98, 99 are configured to supply power to the other components of the network communication module 18 through the backplane 77, which is electrically coupled to the module 18 via the backplane interface 78. Although one embodiment depicts a battery module 88, in other embodiments, the batteries 98, 99 may be coupled directly to the backplane 77 without being inserted in any of the chassis slots 74. Further, it is unnecessary for the batteries 98, 99 to reside on the same module 88 and/or reside on a module 88 dedicated to the batteries 98, 99. As an example, any of the batteries 98, 99 may reside on any of the communication modules 18, 19, if desired. Indeed, the batteries 98, 99 could reside on the same module 18 as the battery sensing elements 91, 92.

Figure 6:
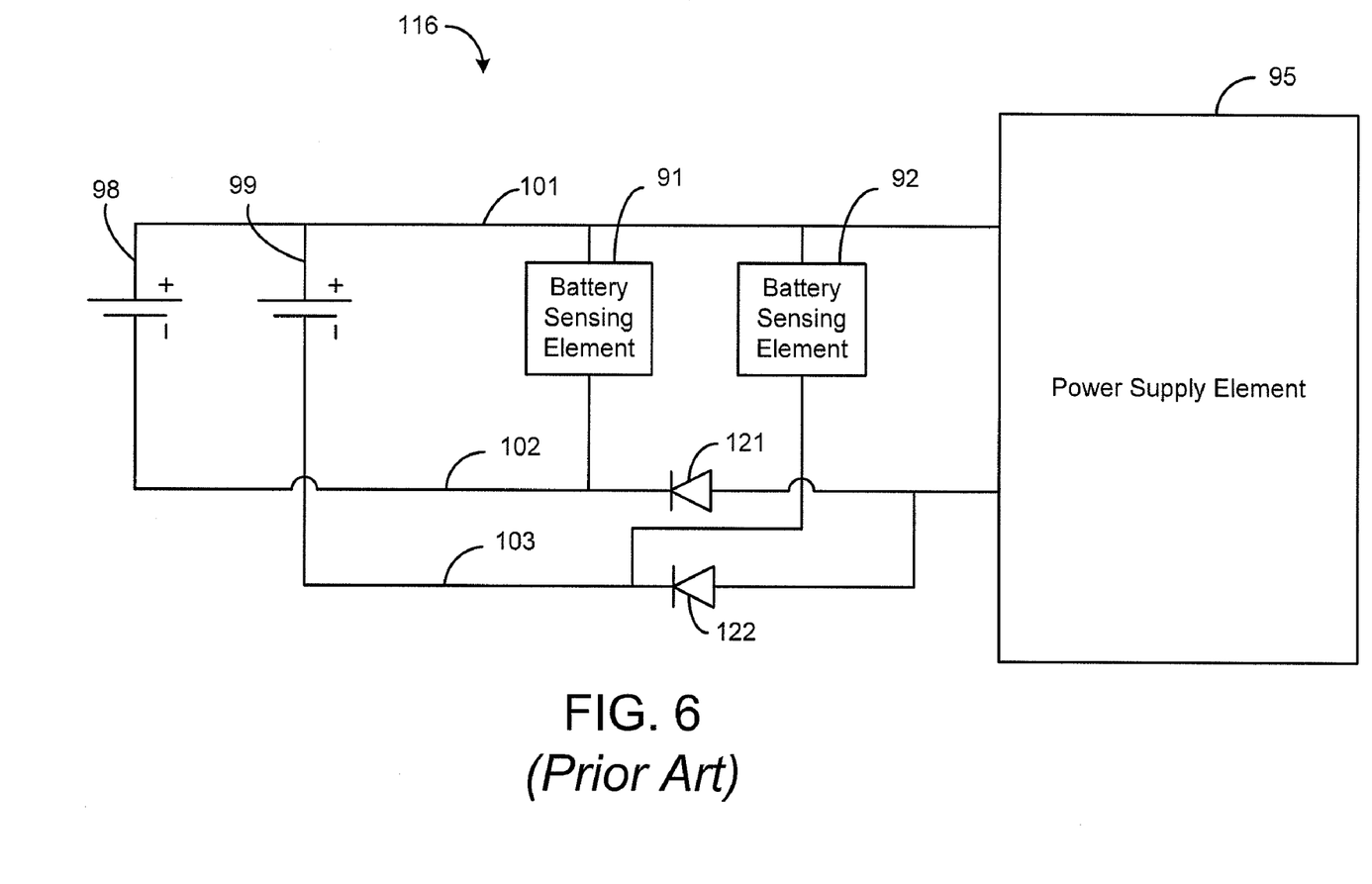
FIG. 6 is a block diagram illustrating the conventional battery sensing circuitry depicted in FIGS. 4 and 5.

FIG. 6 is a circuit diagram depicting the conventional battery sensing circuitry 116 of FIGS. 4 and 5. FIG. 6 depicts the circuitry 116 that results from the interconnection of the network communication module 18 (FIG. 4) and the battery module 88 (FIG. 5) to the backplane 77. As explained above, the battery 98 is coupled on its positive terminal to the positive voltage connection 101 and on its negative terminal to the negative voltage connection 102 and provides electrical power to the power supply element 95. The battery 99 is coupled on its positive terminal to the positive voltage connection 101 and on its negative terminal to the negative voltage connection 103, and also provides electrical power to the power supply element 95. Due to the presence of the diodes 121, 122, which are sometimes referred to as "ORing diodes," the battery 98, 99 with the higher voltage powers the power supply element 95, while the other battery 98, 99 serves as a backup power supply. This allows the system to continue operation even when one of the batteries 98, 99 fails or is removed. In addition, the ORing configuration of the systems enables the power burden to be shared by the batteries 98, 99 in an efficient manner depending on which battery 98, 99 is more charged.

The diode 121 is located along the negative voltage connection 102, with the cathode end of the diode 121 coupled to the negative terminal of the battery 98. The diode 122 is positioned along the negative voltage connection 103, with the cathode end of the diode 122 coupled to the negative terminal of the battery 99. Ideally, the diodes 121, 122 allow current to flow only in the anode-to-cathode direction, but in reality each diode 121, 122 has a small amount of leakage current in the cathode-to-anode direction.

Furthermore, with reference to FIG. 6, the battery sensing element 91 is connected in parallel to the battery 98. That is, the battery sensing element 91 is connected to the positive voltage connection 101 and to the negative voltage connection 102 at the cathode end of the diode 121. Similarly, the battery sensing element 92 is connected in parallel to the battery 99. That is, the battery sensing element 92 is connected to the positive voltage connection and to the negative voltage connection 103 at the cathode end of the diode 122.

The anode ends of the diodes 121, 122 are connected to a power supply element 95 (FIG. 5). Ideally, if a battery 98, 99 is removed from the system or if a battery's voltage falls below a threshold, the corresponding battery sensing element 91, 92 will send an alarm signal indicative of a battery alarm condition. However, in practice, the battery sensing elements 91, 92 may fail to perform properly due to the leakage current from the diodes 121, 122. In this regard, the leakage current can create a voltage potential across the battery terminals even if a battery is not present. For example, leakage current passing through the diode 121 can cause a voltage potential across the terminals for the battery 98 even if the battery 98 is not present. In addition, leakage current passing through the diode 122 can cause a voltage potential across the terminals for the battery 99 even if the battery 99 is not present.

Once the leakage current through a diode 121, 122 reaches a certain threshold, the voltage potential becomes sufficiently high such that a battery sensing element 91, 92 is unable to detect a battery alarm condition regardless of the state of the batteries 98, 99. In this regard, by detecting the potential difference created by the leakage current, the battery sensing elements 98, 99 may falsely detect the presence of a battery 98, 99 and fail to send an alarm signal even if the battery 98, 99 has been removed. The exemplary embodiments of the present disclosure, discussed in more detail hereinafter, address this problem created by leakage current.

Figure 7:
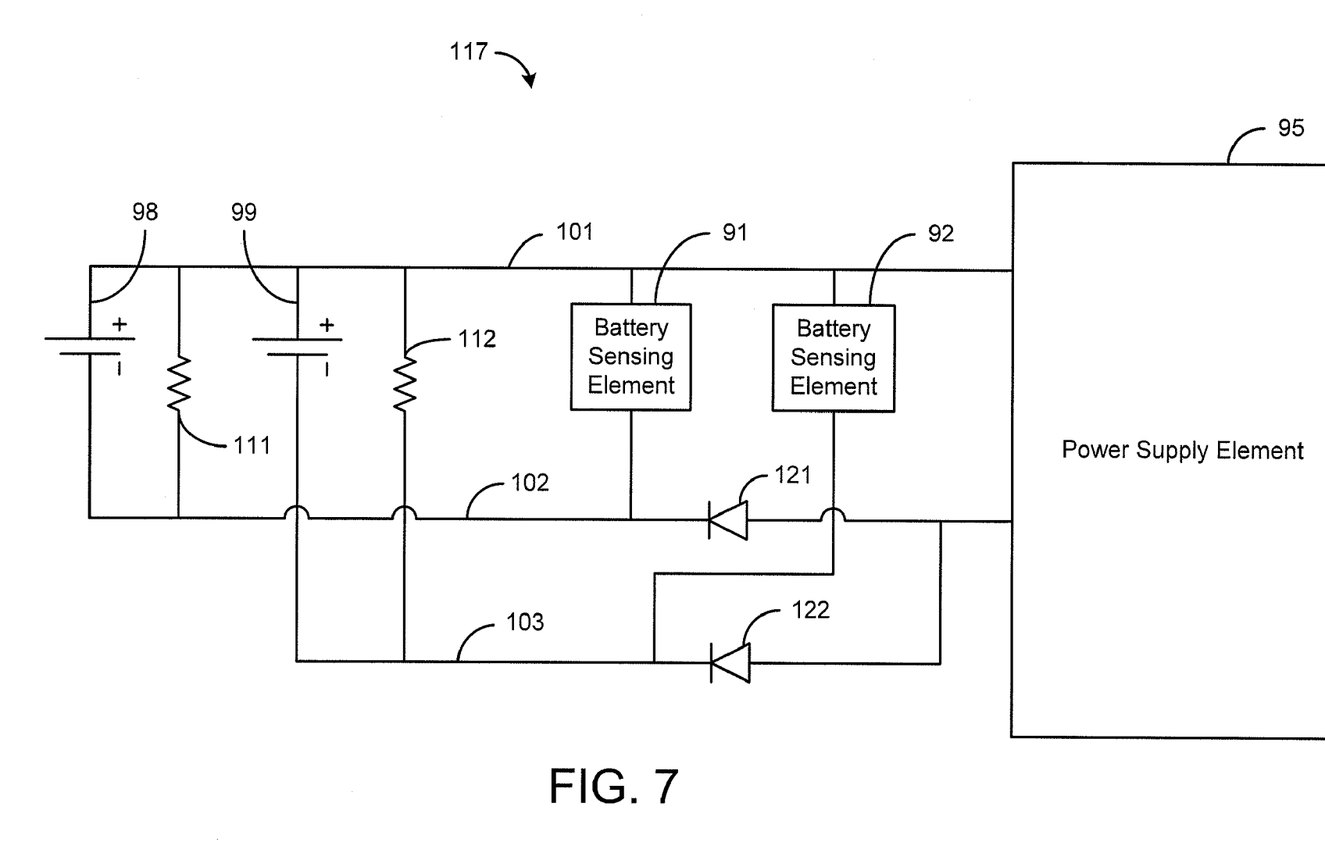
FIG. 7 is a block diagram illustrating an exemplary embodiment of a battery sensing circuit having resistors implemented in parallel with the batteries of FIG. 6.

FIG. 7 depicts an exemplary embodiment of a battery sensing circuit 117 comprising resistors 111, 112 in parallel to batteries 98, 99. As shown in FIG. 7, a resistor 111 is connected in parallel to the battery 98 and the battery sensing element 91. One end of the resistor 111 is connected to the positive voltage connection 101, which is connected to the positive terminal of the battery 98, and the other end of the resistor 111 is connected to the negative voltage connection 102, which is connected to the negative terminal of the battery 98. Similarly, a resistor 112 is connected in parallel to the battery 99 and the battery sensing element 92, with one end of the resistor 112 connected to the positive voltage connection and the other end of the resistor 112 connected to the negative voltage connection 103. By positioning the resistors 111, 112 in parallel to the batteries 98, 99, the leakage current is dissipated across the diodes 121, 122 by the resistors 111, 112 when the corresponding batteries 98, 99 are removed, thus eliminating the problem of leakage current and allowing the battery sensing elements 91, 92 to function properly. However, one drawback is that the resistors 111, 112 waste a significant amount of power when current passes through them. Also, this power is lost even when the batteries 98, 99 are functioning properly. Nevertheless, the presence of the resistors 111, 112 prevents the leakage current through the diodes from generating a sufficiently high voltage across the battery terminals that would otherwise cause the battery sensing elements 91, 92 to falsely detect the presence of batteries 98, 99.

Figure 8:
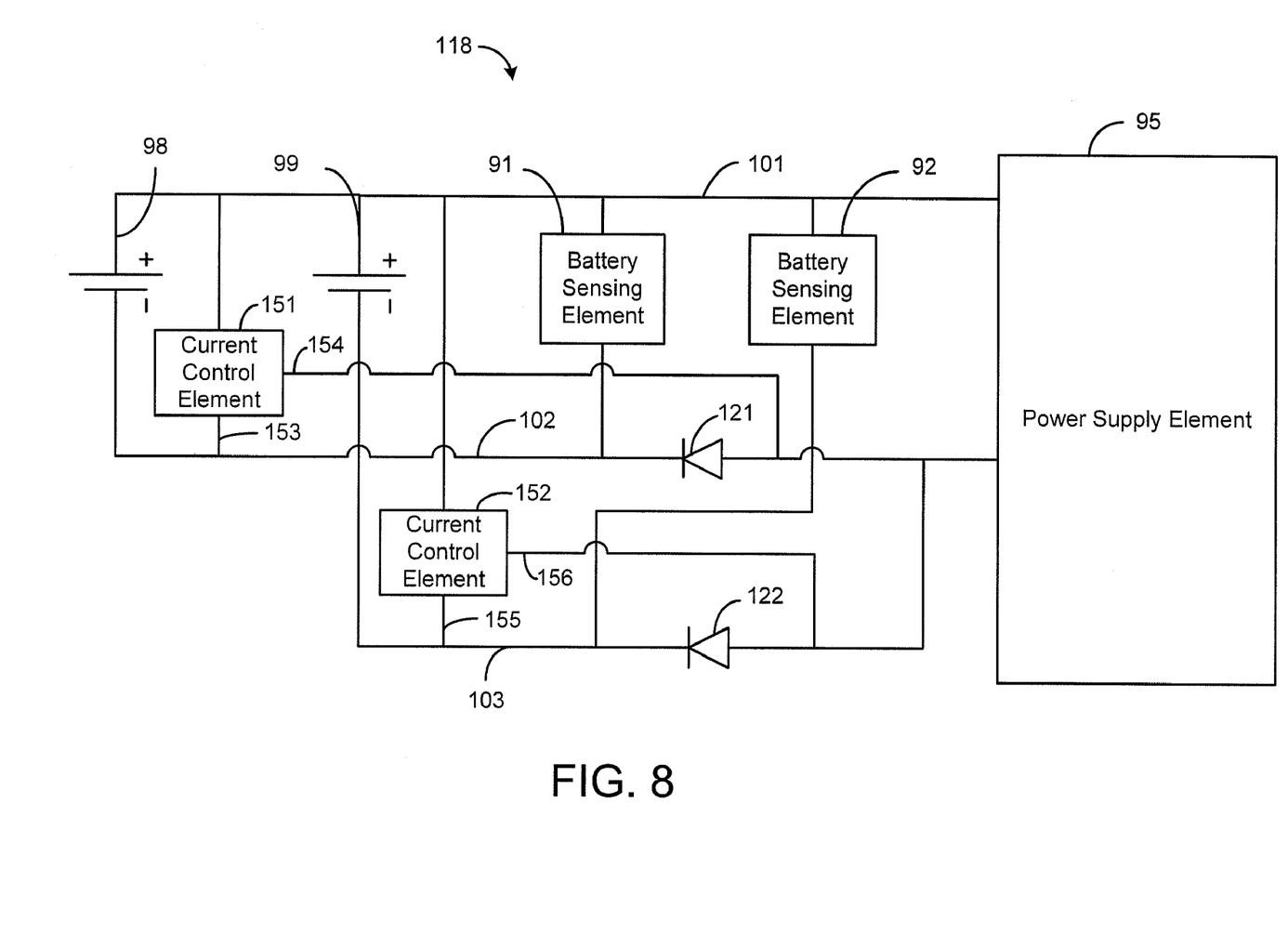
FIG. 8 is a block diagram illustrating an exemplary embodiment of a battery sensing circuit.
Figure 9:
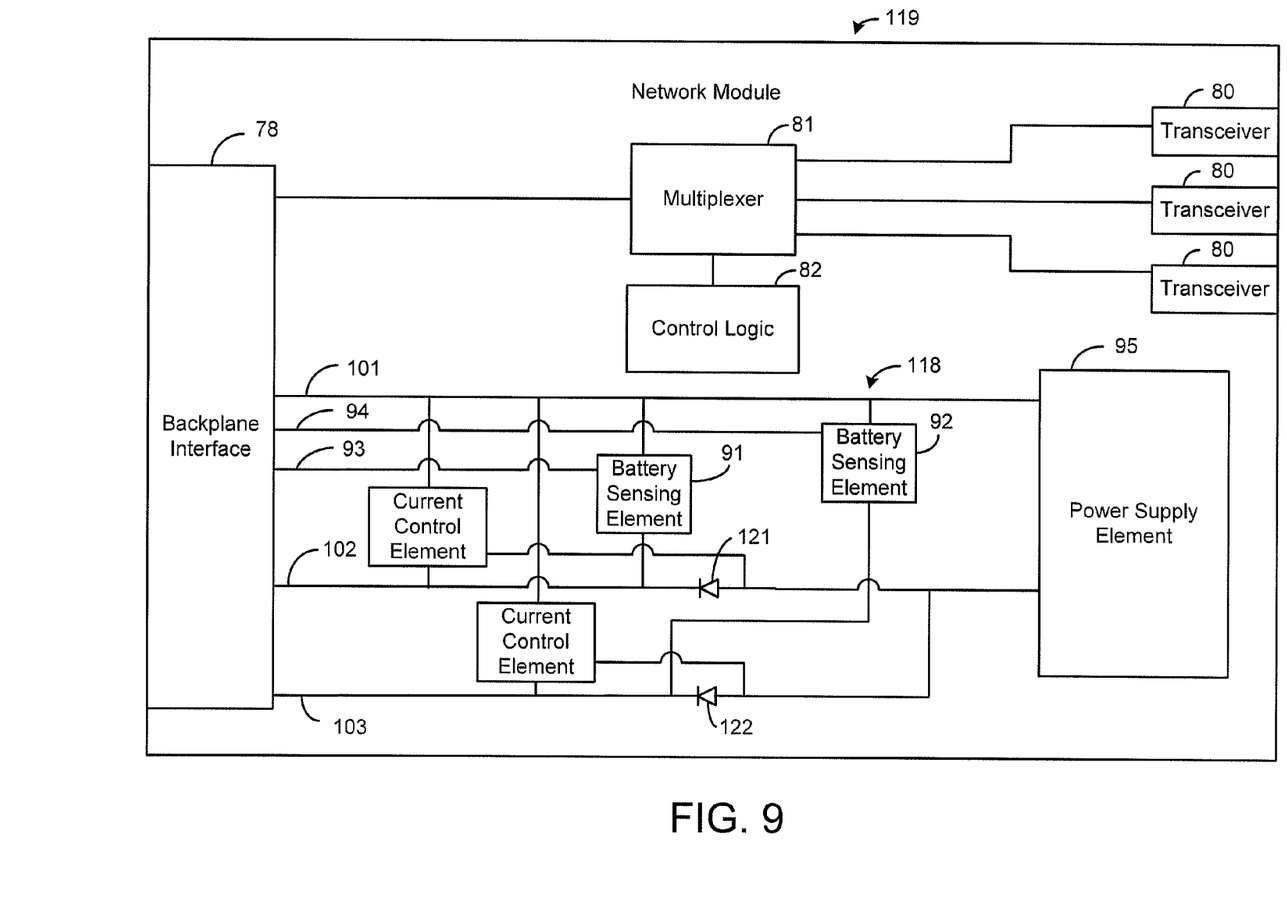
FIG. 9 is a block diagram illustrating an exemplary embodiment of a network communication module on which the battery sensing circuit of FIG. 8 is implemented.

FIG. 8 depicts another exemplary embodiment of a battery sensing circuit 118. In the exemplary embodiment of FIG. 8, the battery sensing circuit 118 is identical to the circuit 116 of FIG. 6 except that the circuit 118 of FIG. 8 comprises current control elements 151, 152, as will be described in more detail hereafter. As shown by FIG. 9, the battery sensing element may be implemented on a network module 119 configured for insertion into a slot 74 of the conventional chassis 68 (FIG. 2) for monitoring the batteries 98, 99 of the battery module 88.

Referring to FIG. 8, the current control elements 151, 152 are configured to control the flow of current to the battery sensing elements 91, 92 and mitigate the problems described above for the conventional circuitry 116. The current control element 151 is connected to the positive terminal of the battery 98 on the positive voltage connection 101, the cathode end of the diode 121 on the negative voltage connection 102, and the anode end of the diode 121 on the negative voltage connection 102. Similarly, the current control element 152 is connected to the positive terminal of the battery 99 on the positive voltage connection 101, the cathode end of the diode 122 on the negative voltage connection 103, and the anode end of the diode 122 on the negative voltage connection 103. Thus, both current control elements 151, 152 are connected to positive and negative terminals of their respective batteries 98, 99 and to the cathode and anode ends of their respective diodes 121, 122.

An input connection 153 of the current control element 151 is connected to the cathode end of the diode 121, and an output connection 154 of the current control element 151 is connected to the anode end of the diode 121. Similarly, an input connection 155 to the current control element 152 is connected to the cathode end of the diode 122, and an output connection 156 is connected to the anode end of the diode 122. Because the battery sensing elements 91, 92 are connected in parallel to the batteries 98, 99, respectively, the input connection 153, 155 of each current control element 151, 152 is connected to the negative terminal of a respective battery 98, 99, the negative side of a respective battery sensing element 91, 92, and the cathode end of a respective diode 121, 122, as shown by FIG. 8. Each current control element 151, 152 is configured to measure the voltage across a respective set of battery terminals and to determine whether the measured voltage exceeds a certain threshold, referred to hereafter as the "voltage threshold." Once the current at the input connection 153, 155 of the current control element 151, 152 becomes sufficiently high such that the measured voltage reaches the voltage threshold, the current control element 151, 152 switches states such that the current flows into the current control element 151, 152, where it is directed to the output connection 154, 156 at the anode end of the diode 121, 122. The voltage threshold is preferably established such that the voltages induced across the battery terminals by the leakage current do not exceed the threshold used by the battery sensing elements 91, 92 to detect battery alarm conditions, thereby preventing the leakage current from causing erroneous assessments by the battery sensing elements 91, 92.

Figure 10:
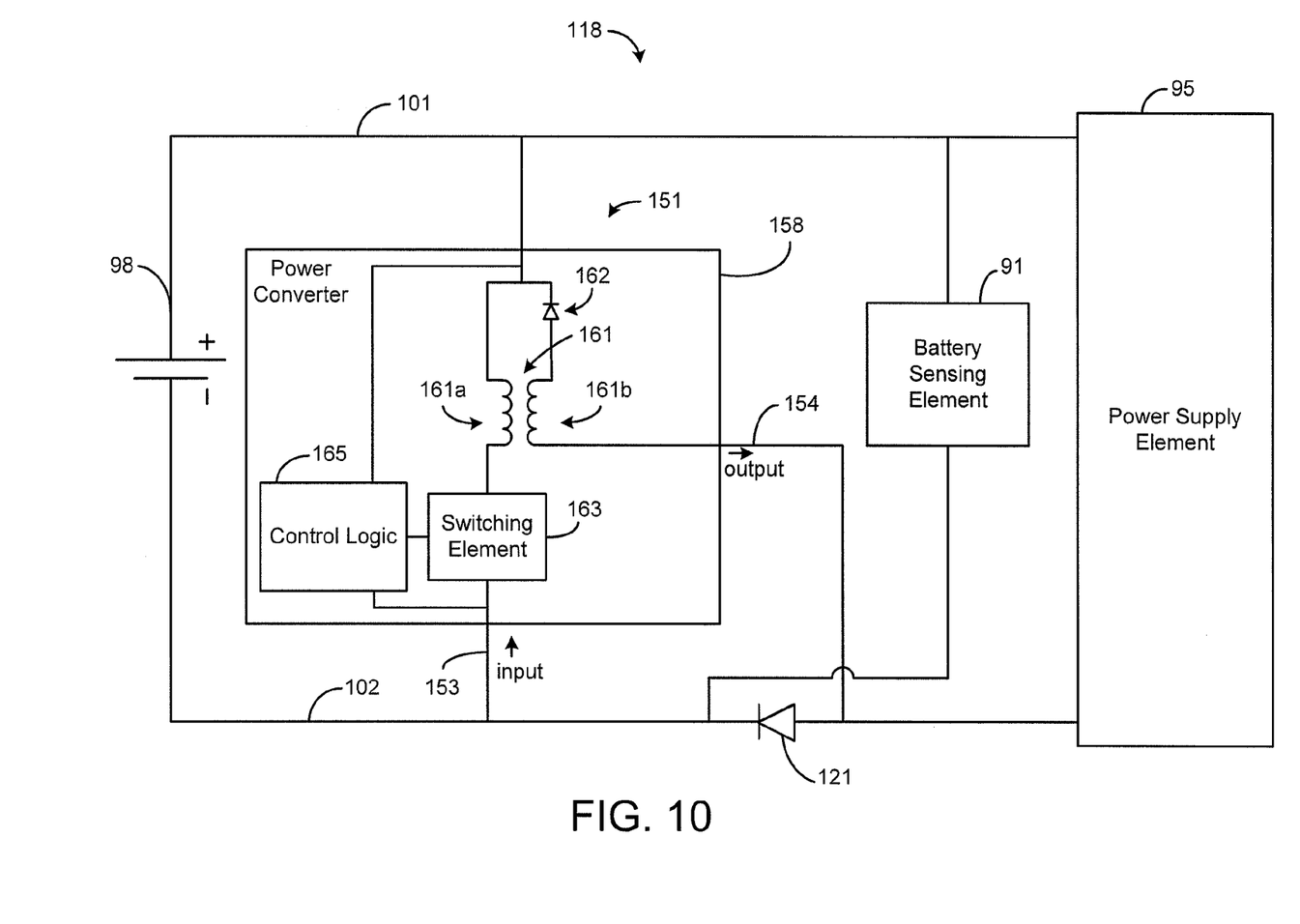
FIG. 10 is a block diagram illustrating one embodiment of the exemplary battery sensing circuit of FIG. 8.

FIG. 10 depicts one exemplary embodiment of a current control element 151 (FIG. 8) implemented in one loop of the exemplary battery sensing circuit 118 of the present disclosure. In the embodiment depicted in FIG. 10, the current control element 151 (FIG. 8) comprises a power converter 158 configured to transfer energy from the cathode end of the diode 121 to the anode end of the diode 121. FIG. 10 only depicts one loop of the exemplary battery sensing circuit 118 for brevity. If desired, the current control element 152 (FIG. 8) may be configured similar or identical to the current control element 151.

The power converter 158 has a transformer 161, a transformer diode 162, a switching element 163, and control logic 165. The switching element 163 is connected between the cathode end of the diode 121 and the negative end of the primary side 161a of the transformer 161. The switching element 163 is configured to transition between an open state and a closed state in order to control the flow of current to the transformer 161. When in the open state, the switching element 163 functions as an open circuit and prevents current from passing through it. When in the closed state, the switching element 163 allows current to pass thereby charging the transformer 161 with energy from the cathode end of the diode 121.

Control logic 165 is configured to sense the voltage across the terminals for the battery 98 while the switching element 163 is in the open state and transition the switching element 163 to the closed state when the voltage exceeds the voltage threshold. The voltage threshold of the control logic 165 is preferably established below the threshold at which the battery sensing element 91 senses the presence of the battery 98. The control logic 165 is also configured to sense the current passing through the switching element 163 while the switching element 163 is in the closed state and transition the switching element 163 to the open state when the current reaches or exceeds a threshold, referred to hereafter as the "current threshold." The current threshold is preferably established such that the switching element 163 is transitioned to the open state when the current flowing through the switching element 163 creates a voltage across the terminals for the battery 98 below a level at which the battery sensing element 91 senses the presence of the battery 98. In one exemplary embodiment, the switching element 163 and control logic 165 are implemented in hardware. In other embodiments, the control logic 165 and/or switching element 163 can be implemented in hardware, software, firmware, or any combination thereof.

The transformer 161 is configured to store energy created by current on its primary side 161a when the switching element 163 is in the closed state, and to transfer that stored energy to the secondary side 161b when the switching element 163 is transitioned back to the open state. The output connection 154 of the power converter 158 couples the negative end of the secondary side 161b of the transformer 161 to the anode end of the diode 121. The transformer diode 162 is connected between the positive end of the secondary side 161*b* of the transformer 161 and the positive voltage connection 101, and is configured to permit current to flow only in the anode-to-cathode direction. The positive end of the primary side 161*a* of the transformer 161 is also connected to the positive voltage connection 101.

The switching element 163 remains in the open state until current at the input connection 153 of the power converter 158 causes a voltage across the terminal for the battery to exceed the voltage threshold. Once the switching element 163 is transitioned to the closed state, the switching element 163 remains in the closed state until the current flowing through the switching element 163 reaches the current threshold. Once the current threshold is reached, the switching element 163 is transitioned back to the open state and the transformer 161 is substantially discharged. The foregoing process of transitioning the switching element 163 between the open and closed states is repeated each time the voltage and current thresholds are reached or exceeded.

The positive terminal for the battery 98 is connected to the positive voltage connection 101 and the negative terminal for the battery 98 is connected to the negative voltage connection 102 at the cathode end of the diode 121. The battery sensing element 91 is connected in parallel to the battery 98 between the positive voltage connection 101 and the negative voltage connection 102 at the cathode end of the diode 121. The positive voltage connection 101 and negative voltage connection 102 are connected to a power supply element 95 (FIG. 4) configured to power a load.

For illustrative purposes assume that the battery 98 is present within the circuit 118 and the switching element 163 is initially in the open state. Once the measured voltage exceeds the voltage threshold, the switching element 163 closes and allows the current to flow through the switching element 163 and into the primary side 161*a* of the transformer 161. Once the current flowing through the switching element 163 reaches the current threshold, the switching element 163 is transitioned back to the open state and the charge in the primary side 161*a* of the transformer 161 is transferred to the secondary side 161*b* of the transformer 161, where it then travels to the anode end of the diode 121 via the output connection 154 of the power converter 158.

Now assume that the battery 98 is removed from the battery sensing circuit 118. The control logic 165 senses the voltage induced by the leakage current from the diode 121. If the leakage current creates a voltage below the voltage threshold, the switching element 163 remains in the open state and the current is prevented from flowing through the power converter 158. In such case, the voltage is not sufficiently high to cause an erroneous detection by the battery sensing element 91. Once the leakage current from multiple diodes 121, 122 (FIG. 4) from multiple network communication modules 18, 19 accumulates in the battery sensing circuit 118 through the backplane 77, the voltage potential from the leakage current eventually exceeds the voltage threshold, and the switching element 163 is transitioned to the closed state, allowing the leakage current to flow into the primary side 161*a* of the transformer 161. Once the leakage current flowing through the switching element 163 reaches the current threshold, the control logic 165 transitions the switching element 163 to the open state. When the switching element 163 opens, the charge in the transformer 161 from the leakage current moves to the secondary side 161*b* of the transformer 161 and out of the power converter 158 to the anode of the diode 121. The power converter 158 prevents the leakage current from inducing a voltage across the terminals of the battery 98 that is sufficiently high to exceed the threshold for sensing a battery alarm condition. Thus, the battery sensing element 91 functions properly by sending an alarm signal when the battery 98 is not present or has a voltage below the threshold. In this regard, the leakage current is prevented from causing the battery sensing element 91 to falsely sense the presence of the battery 98 even if the battery has been removed 98.

Furthermore, the power converter 158 of this embodiment and current control elements 151, 152 (FIG. 8) in general are more efficient than the resistors 111, 112 utilized in the battery sensing circuit 117 of FIG. 7 because they waste significantly less power. For example, if the leakage current becomes high enough, assume that each of the resistors 111, 112 (FIG. 7) wastes about 10-15 Watts of power in a particular arrangement. In such an arrangement, assuming that there are two batteries 98, 99 and two resistors 111, 112 in each circuit 117, between about 20 and 30 Watts of power may be wasted per circuit 117. In comparison, the current control elements 151, 152 (FIG. 8) of the battery sensing circuit 118 of the exemplary embodiment of the present disclosure could be configured to only burn around 1 Watt each in a similar arrangement. Thus, in such an example, use of the current control elements 151, 152 may result in power savings of about 18-28 Watts per chassis 68 (FIG. 2).

Figure 11:
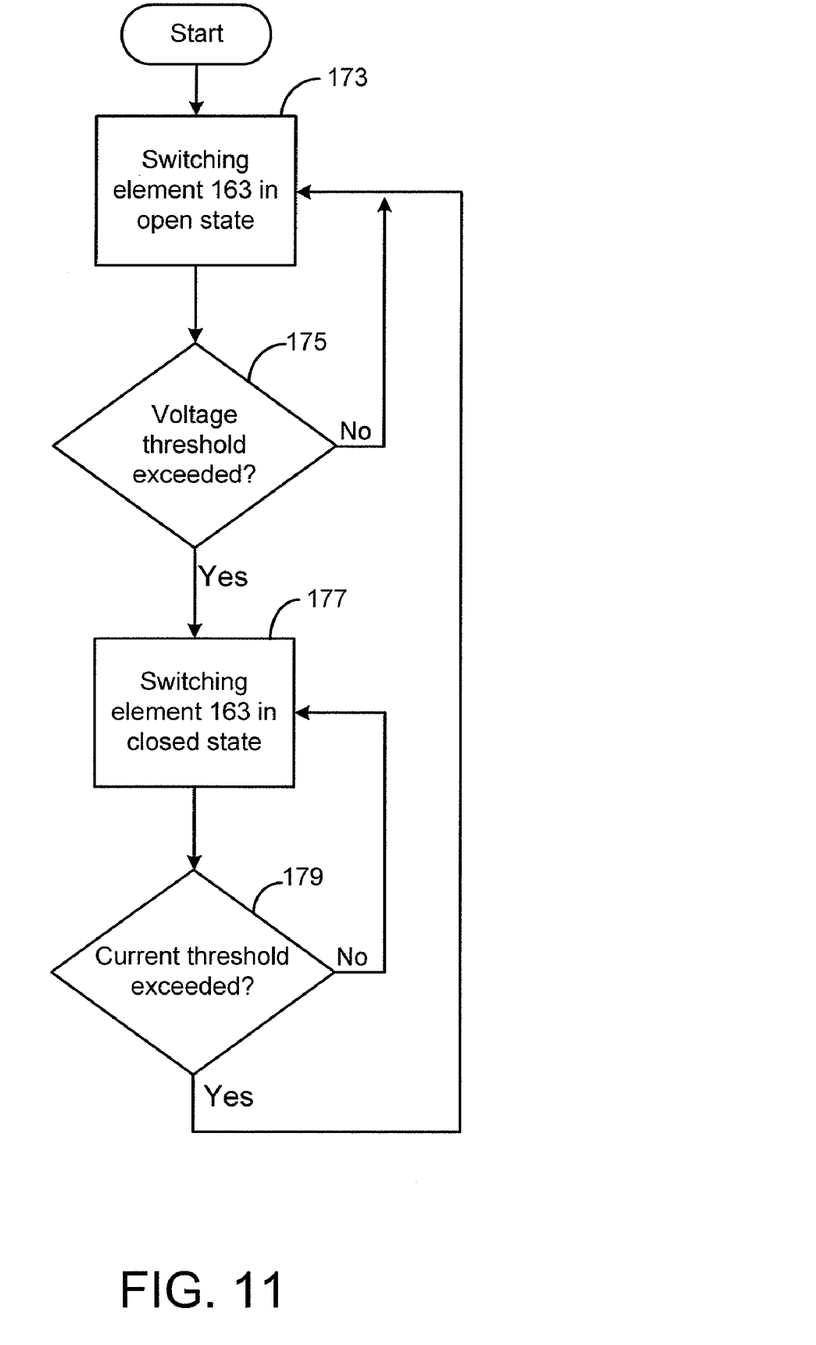
FIG. 11 is a flowchart illustrating the operation of the exemplary battery sensing circuit of FIG. 8.

In one exemplary embodiment, assume that the current control elements 151, 152 comprise power converters 158, as described above. Also assume that the diodes 121, 122 of the network communication modules 18, 19 are not perfect and have leakage current. When both batteries 98, 99 are connected to the circuit 118, the battery 98, 99 with the higher voltage supplies power to the power supply element 95, and the current from the batteries flows through the circuit 118. As depicted in FIG. 11, each power converter 158 is repetitively determining if the voltage across the set battery terminals being monitored by it exceeds the voltage threshold, as shown by block 175, closing the switching element 163 when the voltage threshold is exceeded, as shown by block 177, determining if the current flowing through the switching element 163 exceeds the current threshold, as shown by block 179, and opening the switch to transfer energy to the anode end of a respective diode 121, 122 when the current threshold is exceeded, as shown by block 173.

Now assume that the battery 98 has been removed from the circuit 118. If not for the presence of the current control element 151, leakage current from the diodes 121 of all the network communication modules 18, 19 accumulates and may reach a threshold high enough such that a voltage potential difference is created across the terminals where the battery 98 was located. If this potential difference created by leakage current is allowed to exceed the threshold of the battery sensing element 91, the battery sensing element 91 would fail to sense that the battery 98 has been removed. In such case, the battery sensing element 91 would fail to send an alarm signal indicating that the battery 98 is missing. However, when a power converter 158 is present, as shown by FIG. 10, the control logic 165 in the power converter 158 senses voltage potential caused by the leakage current and determines if it reaches the voltage threshold. If the voltage potential does not reach the voltage threshold 175, the switching element 163 remains in the open state 173 and the leakage current is prevented from flowing through the transformer 161.

Once the leakage current becomes significant enough such that the voltage potential reaches the voltage threshold 175, the control logic 165 transitions the switching element 163 to the closed state, and the leakage current is allowed to pass through to the primary side 161*a* of the transformer 161 thereby charging the transformer 161. Once the leakage current flowing through the switching element 163 to the primary side 161a of the transformer 161 reaches the current threshold, the switching element 163 is transitioned back to the open state causing the energy stored in the primary side 161a of the transformer 161 to be transferred to the secondary side 161b of the transformer 161. Once the energy reaches the secondary side 161b of the transformer 161, it then passes to the anode end of the diode 121 through the output connection 154 of the power converter 158. The switching element 163 remains in the open state until the leakage current reaches the current threshold again. Thus, the leakage current is prevented from reaching a level that would cause the battery sensing element 91 to falsely detect the presence of the battery 98 when the battery 98 has, in fact, been removed. Accordingly, if the battery 98 is removed or if its voltage falls below the threshold used by the battery sensing element 91, the battery sensing element 91 transmits an alarm signal across a connection 93 (FIG. 4) indicating that the element 91 has sensed a battery alarm condition.

Now, therefore, the following is claimed:

1. A power supply system, comprising:
   a first battery terminal;
   a second battery terminal;
   a third battery terminal;
   a fourth battery terminal;
   a first battery coupled to the third and fourth battery terminals;
   a battery sensing element coupled to the first and second battery terminals and configured to sense whether a second battery is between the first and second battery terminals based on a voltage across the first and second battery terminals, the battery sensing element further configured to transmit an alarm signal when the voltage falls below a first threshold;
   a diode coupled to the second battery terminal; and
   a current control element coupled to the diode and the first and second battery terminals, the current control element configured to sense a voltage across the first and second battery terminals and to selectively transfer charge across the diode based on the voltage sensed by the current control element such that leakage current passing through the diode from the first battery is prevented by the current control element from causing the battery sensing element to falsely sense a battery between the first and second terminals.

2. The power supply system of claim 1, wherein the current control element is configured to selectively transfer the charge across the diode based on whether the voltage sensed by the current control element exceeds a second threshold, wherein the second threshold is established below the first threshold such that the current control element prevents the leakage current from causing the voltage sensed by the battery sensing element to exceed the first threshold when no battery is present between the first and second battery terminals.

3. The power supply system of claim 2, wherein the current control element comprises a power converter having a transformer with a primary side and a secondary side, a switching element coupled to the primary side of the transformer, and control logic coupled to the switching element.

4. A power supply system, comprising:
   a first battery terminal;
   a second battery terminal;
   a third battery terminal;
   a fourth battery terminal;
   a first battery coupled to the third and fourth battery terminals;
   a battery sensing element coupled to the first and second battery terminals and configured to sense a voltage across the first and second battery terminals, the battery sensing element further configured to transmit an alarm signal based on the voltage sensed by the battery sensing element when a second battery has been removed from the first and second battery terminals;
   at least one diode coupled to the second battery terminal; and
   a current control element coupled to the at least one diode and the first and second battery terminals, the current control element configured to selectively transfer charge across the at least one diode such that leakage current passing through the at least one diode from the first battery is prevented by the current control element from inducing, across the first and second battery terminals, a voltage that is sufficiently high to cause the battery sensing element to falsely sense a presence of the second battery between the first and second battery terminals when the second battery has been removed from the first and second battery terminals.

5. The power supply system of claim 4, wherein the current control element is configured to sense a voltage across the first and second battery terminals and to selectively transfer the charge across the at least one diode based on the voltage sensed by the current control element.

6. The power supply system of claim 4, wherein the current control element comprises a power converter having a transformer with a primary side and a secondary side, a switching element coupled to the primary side of the transformer, and control logic coupled to the switching element.

7. A method for monitoring a power supply system, comprising the steps of:
   generating, via a first battery of the power supply system, leakage current that passes through a plurality of diodes coupled to the second battery terminal;
   sensing whether a second battery is present between a first battery terminal and a second battery terminal of the power supply system based on a voltage between the first and second battery terminals; and
   transmitting an alarm signal when the voltage falls below a first threshold; and ensuring that the leakage current is prevented by a current control element from causing the voltage to exceed the first threshold, thereby preventing a false detection of battery between the first and second battery terminals, wherein the ensuring step comprises the step of selectively transferring charge across at least one of the diodes based on the voltage.

8. The method of claim 7, wherein the ensuring step comprises the step of determining whether the voltage exceeds a second threshold, wherein the selectively transferring step is based on the determining step.

9. The method of claim 8, wherein the second threshold is below the first threshold.

10. The method of claim 7, wherein the ensuring step further comprises the steps of:
    storing charge when the voltage exceeds the second threshold;
    sensing the leakage current; and
    transferring the charge across the one diode when the leakage current exceeds a current threshold.

11. The method of claim 7, wherein the selectively transferring the charge step comprises the step of transferring the charge from a primary side of a transformer to a secondary side of the transformer based on the voltage.

* * * * *